(12) United States Patent
Ogura et al.

(10) Patent No.: US 8,596,093 B2
(45) Date of Patent: Dec. 3, 2013

(54) OPTICAL ELEMENT MANUFACTURING METHOD AND OPTICAL ELEMENT

(75) Inventors: Kazuyuki Ogura, Yao (JP); Yoshihiro Kamada, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 722 days.

(21) Appl. No.: 12/451,684

(22) PCT Filed: May 21, 2008

(86) PCT No.: PCT/JP2008/059343
§ 371 (c)(1),
(2), (4) Date: Nov. 23, 2009

(87) PCT Pub. No.: WO2008/149670
PCT Pub. Date: Dec. 11, 2008

(65) Prior Publication Data
US 2010/0162762 A1    Jul. 1, 2010

(30) Foreign Application Priority Data
May 31, 2007    (JP) .................................. 2007-144923

(51) Int. Cl.
*C03B 23/00* (2006.01)
*C03B 11/08* (2006.01)
*C03B 11/00* (2006.01)

(52) U.S. Cl.
USPC .......... 65/64; 65/83; 65/102; 65/275; 65/269; 65/286; 65/305

(58) Field of Classification Search
USPC .......... 65/66, 83, 63, 64, 102, 122–123, 286, 65/30
See application file for complete search history.

(56) References Cited

U.S. PATENT DOCUMENTS 4,698,089 A * 10/1987 Matsuzaka et al. ............. 65/290
4,836,840 A *  6/1989 Hirota et al. .................... 65/323

(Continued)

FOREIGN PATENT DOCUMENTS

JP    62-128932 A    6/1987
JP     6-9231 A     1/1994

(Continued)

OTHER PUBLICATIONS

English Language Machine Translation of JP 2006-096605 (Accessed May 29, 2012 from http://www4.ipdl.inpit.go.jp/Tokujitu/PAJdetail.ipdl?N0000=60&N0120=01&N2001=2&N3001=2006-096605).*

(Continued)

*Primary Examiner* — Jason L Lazorcik
(74) *Attorney, Agent, or Firm* — Brinks, Gilson & Lione (57) ABSTRACT

Provided is an optical element manufacturing method by which optical elements, such as a beam shaping element having a molded side surface, are highly efficiently and accurately manufactured by pressure-molding a molten glass drop. After supplying a lower molding die with the molten glass drop of a prescribed volume at a temperature higher than that of the molding die, the molten glass drop is pressure-molded by the molding die, and a free surface solidified without being in contact with the molding die is formed between a molded upper surface and the molded side surface. The volume of the molten glass drop to be supplied is 0.8 times or more but not more than 0.97 times the volume of a space configured by an extended molded upper surface, an extended molded side surface and the molded lower surface when the molded upper surface and the molded side surface are extended.

7 Claims, 5 Drawing Sheets

(56) References Cited

U.S. PATENT DOCUMENTS

| | | | |
|---|---|---|---|
| 4,941,906 A * | 7/1990 | Schmitt | 65/29.12 |
| 5,173,100 A * | 12/1992 | Shigyo et al. | 65/102 |
| 5,211,969 A * | 5/1993 | Yoshimura | 425/395 |
| 5,322,541 A * | 6/1994 | Shimizu et al. | 65/66 |
| 5,588,980 A * | 12/1996 | Ito | 65/223 |
| 5,822,134 A * | 10/1998 | Yamamoto et al. | 359/718 |
| 6,295,172 B1 * | 9/2001 | Yamamichi et al. | 359/819 |
| 6,560,994 B1 * | 5/2003 | Hirota | 65/24 |
| 6,567,223 B2 * | 5/2003 | Ludington | 359/811 |
| 7,147,454 B2 * | 12/2006 | Wang | 425/408 |
| 7,383,697 B2 * | 6/2008 | Hosoe et al. | 65/102 |
| 7,415,842 B2 * | 8/2008 | Sakata et al. | 65/64 |
| 7,559,214 B2 * | 7/2009 | Nishikawa | 65/66 |
| 8,357,624 B2 * | 1/2013 | Hayashi et al. | 501/50 |
| 2006/0250698 A1 * | 11/2006 | Ogura et al. | 359/642 |
| 2006/0260363 A1 * | 11/2006 | Tada et al. | 65/385 |
| 2010/0058809 A1 * | 3/2010 | Ogura et al. | 65/66 |
| 2010/0162762 A1 * | 7/2010 | Ogura et al. | 65/66 |

FOREIGN PATENT DOCUMENTS

| | | |
|---|---|---|
| JP | 2002-208159 A | 7/2002 |
| JP | 2004-339039 | 12/2004 |
| JP | 2006-96605 A | 4/2006 |
| JP | 2006-290692 | 10/2006 |

OTHER PUBLICATIONS

International Search Report in International Application No. PCT/JP2008/059343, dated Aug. 26, 2008, 2 pages.

* cited by examiner

OPTICAL ELEMENT MANUFACTURING METHOD AND OPTICAL ELEMENT

This application is a National Stage of International Application PCT/JP2008/059343 filed with Japanese Patent Office on May 21, 2008.

TECHNICAL FIELD

The present invention relates to methods for manufacturing an optical element by pressure-molding a molten glass drop and to optical elements, and in particular, to methods for manufacturing an optical element such as a beam shaping element for shaping the cross section of a light beam emitted from a semiconductor laser into a circular shape and to optical elements.

BACKGROUND ART

A semiconductor laser is usually used as a light source for a pickup device for recoding and reproducing information on and from a recording medium such as a DVD. The light beam emitted from the semiconductor laser has an elliptical shaped cross section since the beam is emitted from the end surface of a thin activation layer. When the light beam is shaped into a circular beam by using a beam shaping element, and is then used, efficiency of the light beam can be raised, whereby the accuracy of recording and reproducing can be improved. Particularly, such a beam shaping element is of great importance when used in a pickup device using a blue semiconductor laser as a light source since the blue semiconductor laser tends to have insufficient intensity of the emitted beam.

As the beam shaping element for shaping the cross section of a light beam emitted from a semiconductor laser, known is a beam shaping element (lens) which has a cylindrical surface with a curvature only in the direction the shorter axis of the cross section of the beam (see Patent Document 1, for example).

As a manufacturing method of an optical element such as the beam shaping element, a pressure-mold method using a metal molding die is known. In particular, a method in which an optical element is directly manufactured by pressure-molding a molten glass drop dispensed in a metal molding die is gathering attentions and is being investigated because very high production efficiency is expected in principle (see Patent Documents 2 and 3, for example).

High precision in positioning with respect to a light source is required when the beam shaping element is assembled into an optical system. Therefore, it is proposed in Patent Document 2 that an optical element is molded, in a square hole in a member having the square hole, to form a side molded-surface which is to be used as a reference surface when assembling. In Patent Document 3, proposed is a method where a method in which the temperature of a member, of a molding die, for forming a side molded-surface is set higher than the other members so that breaking and cracking are prevented, whereby an optical element having a positioning reference surface is stably manufactured.

Patent Document 1: Japanese Unexamined Laid-open Patent Application Publication No. 2002-208159

Patent Document 2: Japanese Unexamined Laid-open Patent Application Publication No. 2006-290692

Patent Document 3: Japanese Unexamined Laid-open Patent Application Publication No. 2004-339039

DISCLOSURE OF INVENTION

Object of the Invention

However, it is very difficult to obtain high precision on both of the upper and lower molded-surfaces by the method for manufacturing an optical element having a side molded-surface directly from a molten glass drop. The temperature of the molten glass drop is higher than that of the metal molding die. Therefore, the glass drop is rapidly cooled by heat transfer through the surface in contact with the metal molding die when the molten glass drop is supplied in the metal molding die. Thus, the cooling is rapidly progresses from the side surface when the side surface of the molten glass drop touches the metal molding die, and large temperature difference is created between the circumference portion and the center portion of the molten glass drop.

In order to obtain a molded-surface having high shape precision by pressure-molding, it is necessary to keep applying predetermined pressure until the glass is sufficiently solidified. However, if the above-mentioned temperature difference exists, a time difference of solidification is caused between the circumference portion and the central portion, and the glass is solidified quicker in the circumference portion than in the central portion. The shrinkage in the central portion is continued after the solidification at the circumference portion, and the applied pressure is blocked by the solidified circumference portion, thus sufficient pressure is not applied to the central portion. As a result, the precision of molding is degraded.

As described in Patent Publication 3, the temperature difference between the circumference portion and the central portion can be decreased in some degree by raising the temperature of the member for transferring the side molding surface. However, very high precision is required for the optical element such as the beam shaping element, particularly for the beam shaping element to be used for a blue semiconductor laser. Such a high precision cannot be realized only by the method described in Patent Publication 3, and the shrinkage was a beg problem.

The present invention is conceived in view of the above-mentioned technological problem. An object of the invention is to provide a method by which an optical element such as a beam shaping element having a side molded-surface is manufactured by pressure-molding with high efficiency and high precision, and a high precision optical element manufactured by that manufacturing method.

Means for Solving the Object

In order to solve the above problems, the present invention has the following features.

1. A method for manufacturing an optical element having an upper molded-surface, a lower molded-surface, and a side molded-surface by pressure-molding a molten glass drop using a molding die having an upper die for molding the upper molded-surface, a lower molding die for molding the lower molded-surface, and a side molding die for molding the side molding surface, the method comprising the steps of:

supplying the lower molding die with the molten glass drop of a predetermined volume and a temperature higher than a temperature of the molding die;

pressure-molding, after the molten glass is supplied to the lower molding die, the molten glass with the molding die so as to form a free surface, between the upper molded-surface and the side molded-surface, to be solidified while being apart from the molding die, wherein the predetermined volume is 0.8 times or more and 0.97 times or less a volume of a space defined by an extended upper molded-surface made by extrapolating the upper molded-surface, an extended side molded-surface made by extrapolating the side molded-surface, and the lower molded-surface.

2. The method of item 1 for manufacturing an optical element, wherein the optical element includes an optical surface in each of the upper molded-surface and the lower molded-surface.

3. The method of item 1 for manufacturing an optical element, wherein the side surface is to be used as a reference surface for positioning when the optical element is assembled into an optical system.

4. The method of item 3 for manufacturing an optical element, wherein the side molded-surface includes two plane surfaces which are approximately perpendicular to each other.

5. The method of item 2 for manufacturing an optical element, wherein the optical element is a beam shaping element for shaping an emitted beam, which is emitted from an semiconductor laser, to have a circular section.

6. The method of item 5 for manufacturing an optical element, wherein at least one of the upper molded-surface and the lower molded-surface has an optical surface including a cylindrical surface or a toroidal surface.

7. An optical element manufactured by pressure-molding a molten glass drop in a molding die, the optical element comprising:
   an upper molded-surface molded in contact with the molding die;
   a lower molded-surface molded in contact with the molding die;
   a side molded-surface molded in contact with the molding die; and
   a free surface formed being apart from the molding die,
   wherein the optical element has a volume 0.8 times or more and 0.97 times or less a volume of a space defined by an extended upper molded-surface made by extrapolating the upper molded-surface, an extended side molded-surface made by extrapolating the side molded-surface, and the lower molded-surface.

Advantage of the Invention

According to the present invention, the temperature difference between in the circumference portion and the central portion is controlled and sufficient pressure is applied until the upper molded-surface is sufficiently solidified since a predetermined volume of molten glass drop is supplied in the metal molding die and pressure-molded so as to form a free surface. Thus, the optical element, such as a beam shaping element, having a side molded-surface is manufactured with high efficiency and high precision.

NUMERALS 10, 10b: beam shaping element (Optical element)
11, 21: Upper molded-surface
12, 22: Lower molded-surface
13, 23: Side molded-surface
14, 14b, 24: Free surface
20: Optical element
30: Metal molding die
31: Upper die
32: Lower die
33: Side die
44, 47: Molten glass drop
110, 210: Extended upper molded-surface
131, 132, 133, 134 and 230: Extended side molded-surface

BEST MODE FOR CARRYING OUT THE INVENTION

The embodiment of the invention is described in detail below referring to FIGS. 1 to 9.

(Optical Element)

The present invention is suitably applied to manufacture a beam shaping element for shaping the cross section of the light beam emitted from a semiconductor laser to a rounded shape. In particular, the method is suitable for manufacturing a beam shaping element having an optical surface constituted of cylindrical or toroidal surface on at least one of the upper and lower molded-surfaces. However, the optical element to which the present invention is directed includes various types of optical elements having an upper molded-surface, a lower molded-surface and a side molded-surface.

The "cylindrical surface" is a surface which has no curvature in a certain direction (hereinafter, referred to as generatrix direction) on a surface perpendicular to the optical axis and has a curvature only in a direction perpendicular to the generatrix direction (hereinafter, referred to as transversal line direction). The cross section perpendicular to the generatrix direction can include non-circular component as well as circular shape. The toroidal surface is a surface formed by curving the cylindrical surface in the generatrix direction, and has different curvatures in the generatrix direction and in the transversal line direction.

Figure 1:
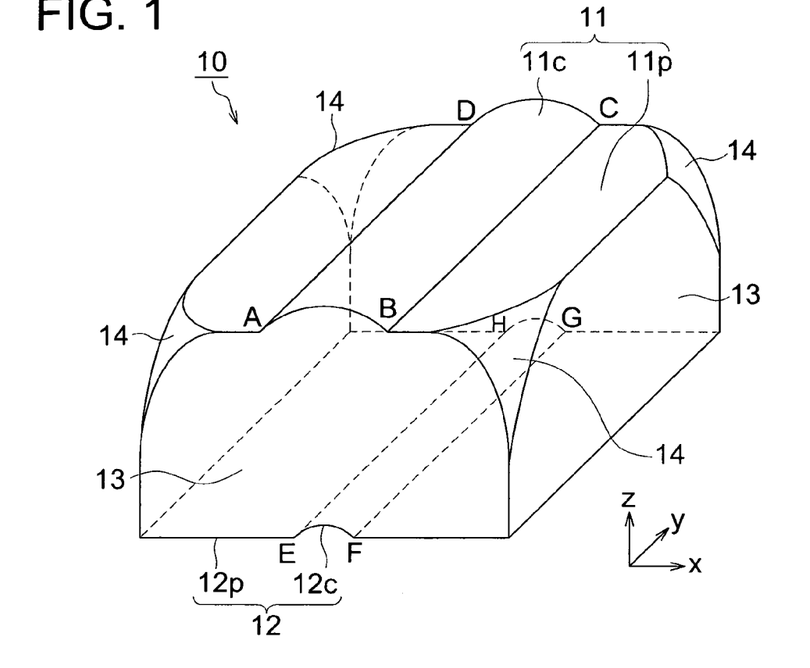
FIG. 1 is a diagram showing a beam shaping element 10 as an example of an optical element of the invention.

FIG. 1 shows a beam shaping element 10 which is an example of the optical element of the invention. The beam shaping element 10 has an upper molded-surface 11 and lower molded-surface 12. The upper molded-surface 11 is a surface molded by the upper molding die when pressure-molding the molten glass drop, and has an optical surface 11c (surface ABCD) and a plane portion 11p outside the optical surface 11c. The lower molded-surface 12 is a surface molded by the lower molding die, and has an optical surface (surface EFGH) 12c and a plane portion 12p outside the optical surface 12c.

The optical surface 11c is a cylindrical surface which has no curvature in the predetermined direction (direction y in FIG. 1) on the face perpendicular to the optical axis (direction z in FIG. 1) and has a curvature only in the direction (direction x in FIG. 1) perpendicular to the above direction. The optical surface 12c is a cylindrical surface similar to the surface 11c. The generatrix direction of the optical surface 11c and that of the optical surface 12c are parallel with each other.

In the beam shaping element 10, the two optical surfaces 11c and 12c facing each other are both cylindrical surface. However, the invention is not limited thereto. For example, the invention can be applied to a beam shaping element having a cylindrical surface on one of the optical surfaces and a plane surface or a spherical surface on the other optical surface, or having a cylindrical surface on one of the optical surfaces and a toroidal surface on the other optical surface.

The beam shaping element 10 has four side molded-surfaces 13. Such beam shaping element is usually required to be positioned with high precision with respect to the light source when assembling the optical system. The variation of the distance between the optical surface and the side molded-surface can be made very small even when many beam shaping elements 10 are manufactured since the side molded-surfaces 13 of the beam shaping element 10 are the surface formed by the side molding die. Therefore, assembling with high precision can be realized by using the any one of the side molded-surfaces 13 as a positioning reference surface when installing the beam shaping element 10 into the optical system.

In particular, the side molded-surfaces 13 of the beam shaping element 10 include two plane surfaces approximately perpendicular to each other. Positioning with high precision in two directions perpendicular to each other (directions x and y, for example) can be performed by using the above two surfaces as the positioning reference surfaces. The two surfaces are not necessarily to be completely perpendicular to each other as long as the surfaces can be used as the positioning reference surfaces for two directions perpendicular to each other.

The beam shaping element 10 has four free surfaces 14 between the upper molded-surface 11 and the side molded-surface 13. The free surfaces 14 are surface formed by solidification without contact with any metal molding die, different from the upper molded-surface 11 and the side molded-surfaces 13. As will be mentioned later, the free surfaces 14 are formed by pressure-molding the molten glass drop after waiting for a predetermined duration after supplying a predetermined amount of molten glass drop onto the lower molding die.

Figure 2:
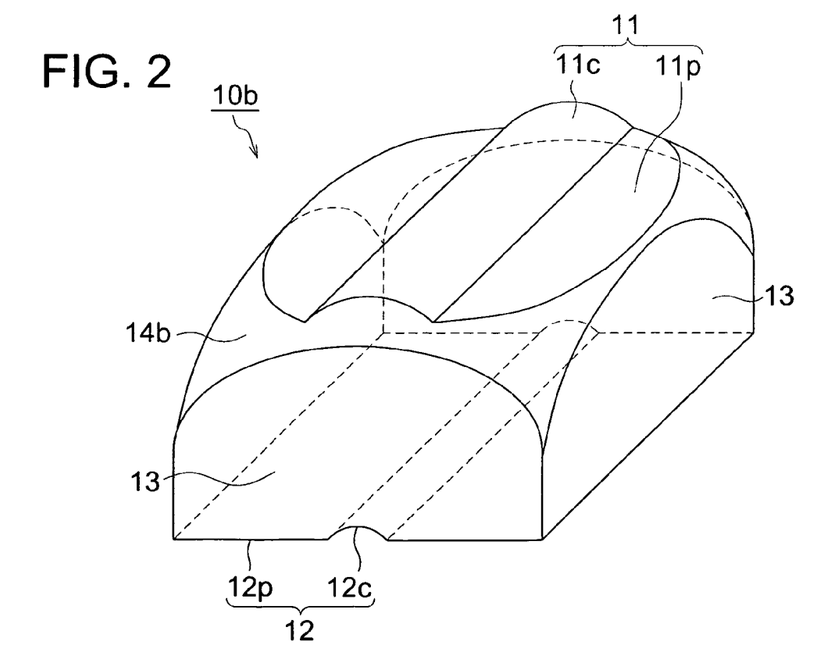
FIG. 2 is a diagram showing an example of modification of the beam shaping element.

FIG. 2 shows an example of a variation of the beam shaping element. In the beam shaping element 10b shown in FIG. 2, a free surface 14b is formed between the upper molded-surface 11 and the side molded-surfaces 13 so as to surround the upper molded-surface 11. In the invention, the element may have plural free surfaces 14 at the corner portions as shown in the beam shaping element 10 or a free surface 14b surrounding the upper molded-surface 11 as shown in the beam shaping element 10b.

The volume of the beam shaping element 10, namely the volume of the molten glass drop to be supplied into the lower molding die, is within the range of from 0.8 to 0.97 times of the volume of the space (hereinafter, referred to as a whole fillable space) formed by an extended upper molded-surface, an extended side molded-surfaces and the lower molded-surface assuming that the upper molded-surface 11 and the side molded-surfaces are extended.

Figure 3:
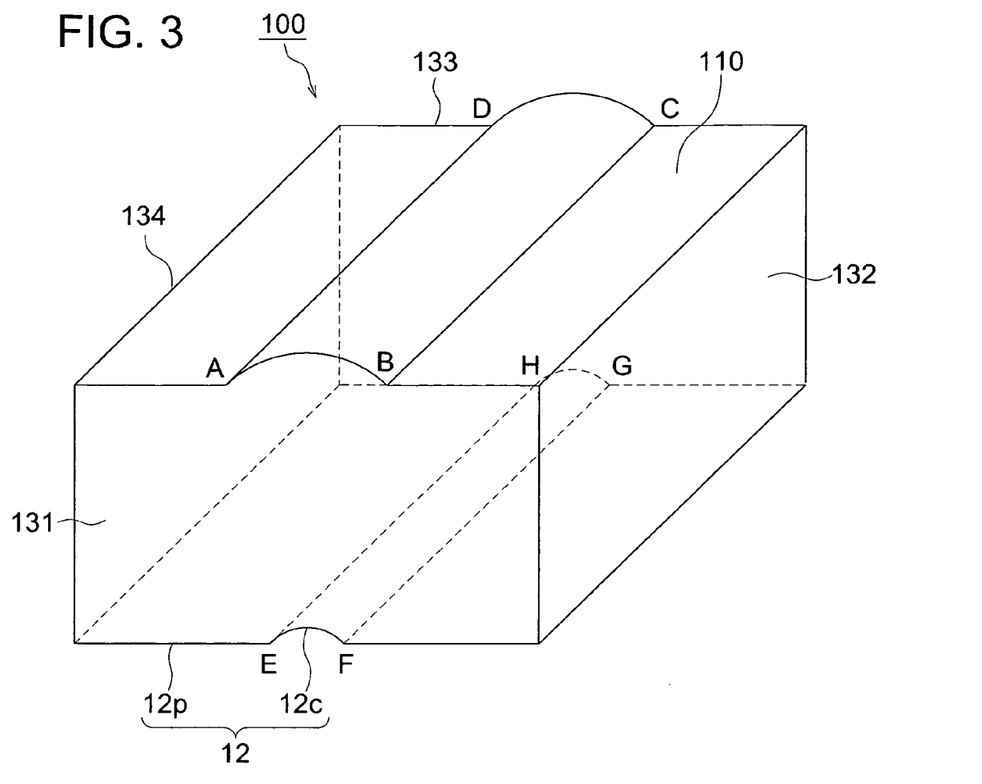
FIG. 3 is a pattern diagram illustrating the whole fillable space of the beam shaping element 10.

FIG. 3 is a schematic drawing illustrating the whole tillable space of the beam shaping element 10. The whole tillable space 100 is defined by the extended upper molded-surface 110, the extended side molded-surfaces 131, 132, 133 and 134 and the lower molded-surface 12.

When the volume of the beam shaping element 10 is larger than 0.97 times of the volume of the whole tillable 100, the molten glass drop contacting with the metal molding die is rapidly cooled through the side surfaces so as to create a large temperature difference between the circumference portion and the central portion of the molten glass drop. Consequently, it is difficult to obtain the molded-surfaces (the upper molded-surface 11 and the lower molded-surface 12) with high precision. In such case, formation of the upper molded-surface with high precision is particularly difficult. When the volume of the beam shaping element 10 is smaller than 0.8 times of the volume of the whole tillable space 100, a long waiting time before the pressure application is required for obtaining the necessary thickness. As a result, the temperature of the molten glass drop is excessively lowered so that the precision of the molded-surface is degraded. As above-described, the optical element having the side molded-surfaces applicable for positioning and the molded-surface with high precision can be manufactured by setting the volume of the beam shaping element to be within the range of from 0.8 to 0.97 times, particularly preferably from 0.85 to 0.95 times, of the volume of the whole fillable space 100.

Figure 4:
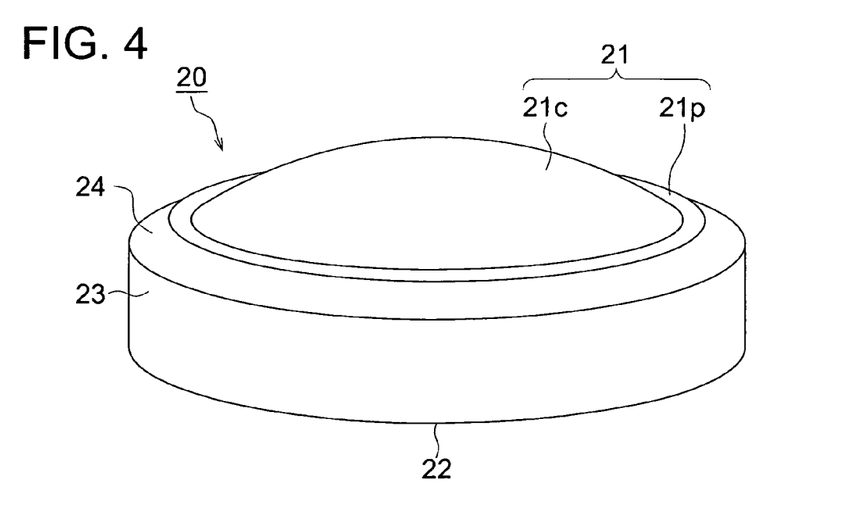
FIG. 4 is a diagram showing an optical element 20 as another example of the optical element of the invention.

FIG. 4 shows another example of an optical element 20 of the invention. The optical element 20 has an upper molded-surface 21 and a lower molded-surface 22. The upper molded-surface 21 is a surface formed by the upper molding die, and has a convex spherical optical surface 21c and a plane portion 21p on the surrounding of the optical surface. The lower molded-surface is a surface formed by the lower molding die and constituted of a plane surface.

The optical element 20 has a side molded-surface 23. The side molded-surface 23 is a surface formed in contact with the side molding die, and the assembling with high precision is realized by using the side molded-surface as the positioning reference surface when installing the optical element 20 into an optical system. As above-mentioned, the shape of the side molded-surface is not limited in the invention, and the side molded-surface may be a plane surface as the side molded-surface 13 of the optical element 10 or the cylindrical surface as the side molded-surface 23 of the optical element 20.

The optical element 20 has a free surface 24, between the upper molded-surface 21 and the side molded-surface 23, formed not in contact with the metal molding die. The free surface 24 of the optical element 20 is formed so as to surround the upper molded-surface.

Figure 5:
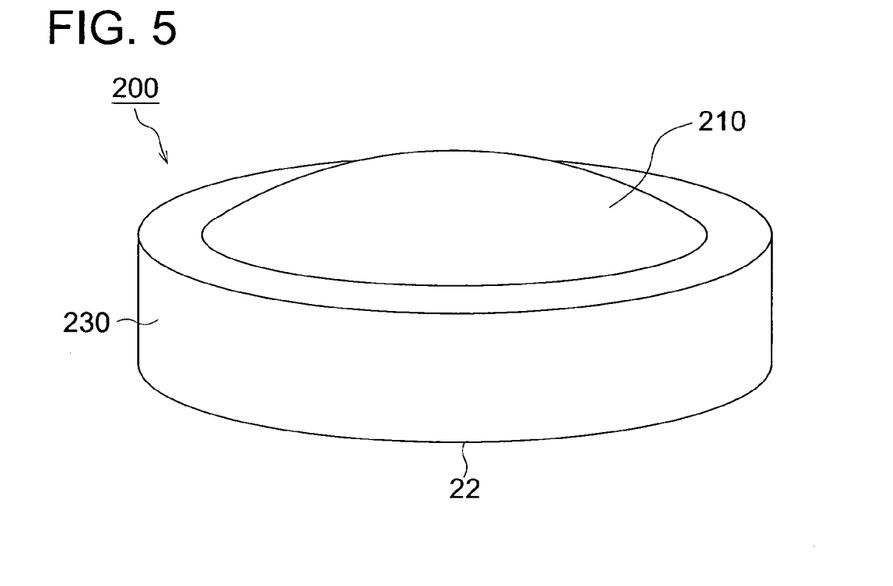
FIG. 5 is a pattern diagram illustrating the whole fillable space of the beam shaping element 10.

FIG. 5 is a schematic drawing for describing a whole fillable space of the optical element 20. The whole fillable space 200 is constituted of an extended upper molded-surface 210, an extended side molded-surface 230 and the lower molded-surface 22 assuming that the upper molded-surface 21 and the side molded-surface 23 of the optical element 20 are extended.

The volume (the volume of molten glass drop supplied to the lower molding die) of optical element 20 is within the range of from 0.8 to 0.97 times of the volume of the fully fillable space 200. The molded-surfaces (the upper molded-surface 21 and the lower molded-surface 22) with high precision can be formed by setting the volume to be within the above range similarly to the case of beam shaping element 10.

(Manufacturing Method of Optical Element)

A manufacturing method of optical element of the invention includes a supplying step in which the predetermined volume of molten glass drop is supplied to the lower molding die and a pressing step in which the molten glass drop supplied to the lower molding die is left for the predetermined duration after the supplying thereof and then pressed with the metal molding dies for pressure-molding. By this method, the optical element is directly manufactured from the molten glass drop. Therefore, the optical element can be manufactured with very high production efficiency.

(Metal Molding Die)

Figure 6:
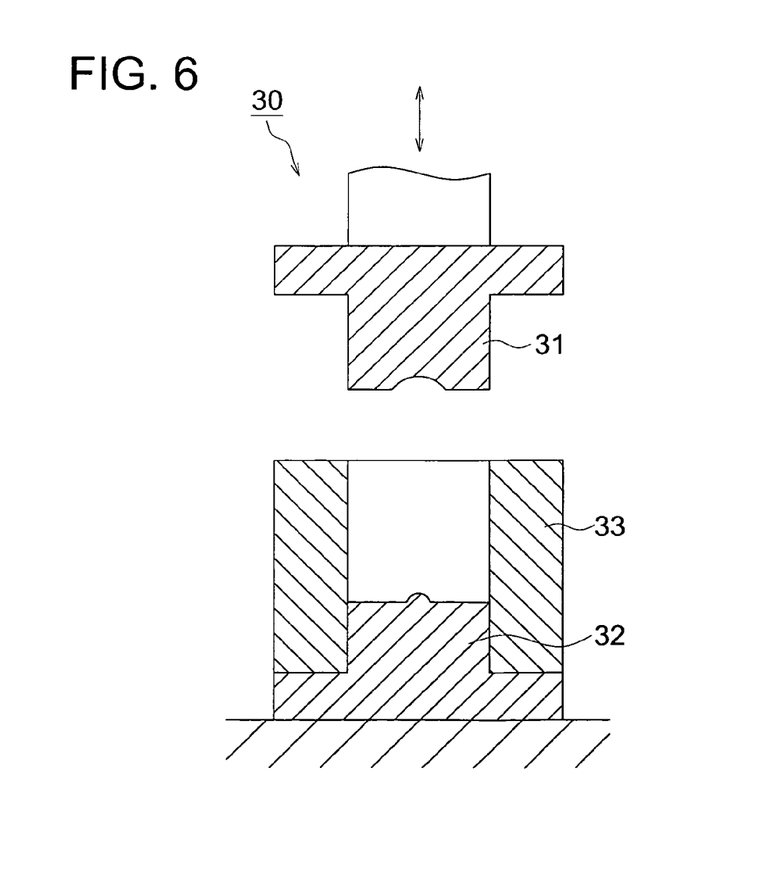
FIG. 6 shows a cross section of an example of the metal molding die for forming the beam shaping element 10.

FIG. 6 shows a cross section of an example of the metal molding die for molding the beam shaping element 10. The metal molding die 30 shown in FIG. 6 includes an upper molding die 31 for forming the upper molded-surface 11 of the beam shaping element 10, a lower molding die 32 for forming the lower molded-surface 12 of the beam shaping element 10 and a side molding die 33 for forming the side molded-surface of the beam shaping element.

The side molding die 33 may be integrated with the lower molding die 32 as a single piece, or configured of independent members as the side molding die 33 and the lower molding die 32 being fixed in combination, as shown in FIG. 6. The upper molding die 31 is movable up and down by a driving means not shown in the drawing so as to press the molten glass drop between itself and the lower molding die 32.

The materials of the upper molding die 31, the lower molding die 32 and the side molding die 33 may be suitably selected from materials known as the materials for molding dies for pressure-molding optical elements, and such materials include heat-resistant alloys (such as stainless steel), ultra hard materials mainly constituted by tungsten carbide, various ceramics (such as silicon carbide and silicon nitride) and carbon-containing complex materials. In addition, the above materials can be used with their surface provided with a protective layer of various metals, ceramics or carbon. The upper molding die 31, the lower molding die 32 and the side molding die 33 may be constituted of the same material or different materials.

The metal molding die 30 is heated to a predetermined temperature in advance before the supply of a molten glass drop. The heating temperature of the upper molding die 31 and the lower molding die 32 of the metal molding die 30 may be selected from the range in which the optical surface can be formed suitably on the optical element. Generally, suitable formation of the optical surface is difficult when the temperature of the upper molding die 31 or the lower molding die 32 is too low. Excessively high temperature is not preferred from the view point of prevention of the adhesion of the molten glass to the metal molding die and the lifetime of the metal molding die. The temperature is usually set at a temperature within the range of from (Tg−100° C.) to (Tg+100° C.), assuming the glass transition temperature of the glass as Tg. However, it is practically preferable that the suitable temperature is experimentally decided since the suitable temperature depends on various conditions such as the kind of glass, the shape and size of optical element, the material of the metal molding die, the kind of protective layer and the positions of the heater for heating and the temperature sensor. Heating temperature of the upper molding die 31 and that of the lower molding die may be the same as or different from each other.

The heating temperature of the side molding die 33 of the metal molding die 30 is usually set within the range of about from (Tg−100° C.) to (Tg+100° C.) similarly to that for the upper molding die 31 and the lower molding die 32. When the temperature of the side molding die 33 is too low, suitable transfer of the optical surface is difficult since cooling of the molten glass drop is excessively rapid in the circumference portion. Excessively high temperature is not preferred from the view point of prevention of adhesion of the molten glass to the die and the lifetime of the molding die 33. In a practical way, the suitable temperature is experimentally decided as in the case of the upper molding die 31 and the lower molding died 32.

In the invention, the molten glass drop heated at a temperature higher than that of the metal molding die 30 is supplied to the lower molding die 32 heated at the predetermined temperature and then pressure-molded by the metal molding die. Therefore, repetition of rising and lowering of the temperature of the metal molding die 30 does not need to be done every production of the optical element, and the later-described supplying process and the pressing process can be carried out while holding the temperature of metal molding die 30 to be constant. Therefore, plural optical elements can be repeatedly manufactured while holding the heating temperature of the metal molding die 30 to be constant. The manufacturing of the optical element can be carried out within very short time with high production efficiency since the heating and cooling of the metal molding die is not necessary.

In the above description, "holding the heating temperature of the metal molding die to be constant" means that the objective temperature in the temperature controlling for heating the metal molding die 30 is kept at a predetermined value. Therefore, temperature variation of the metal molding die caused by contacting with the molten glass drop in the processing course is not prevented, and such temperature variation is permitted.

The heating means for heating the metal molding die 30 at the predetermined temperature is not specifically limited. The whole metal molding die 30 may be heated with one heater, or with plural heaters, or the die can be separately heated by providing a heater and a temperature sensor to each of the upper molding die 31, lower molding die 32 and side molding die 33 to independently control the temperature of each of the parts. As the heater, known heaters may be suitably used. For instance, a cartridge heater may be used by burying it into the member to be heated, or a sheet-shaped heater may be used in contact with the outside surface of the member to be heated. Alternatively, an infrared heating device and a high frequency induction heating device may be used.

(Supplying Step)

Figure 7:
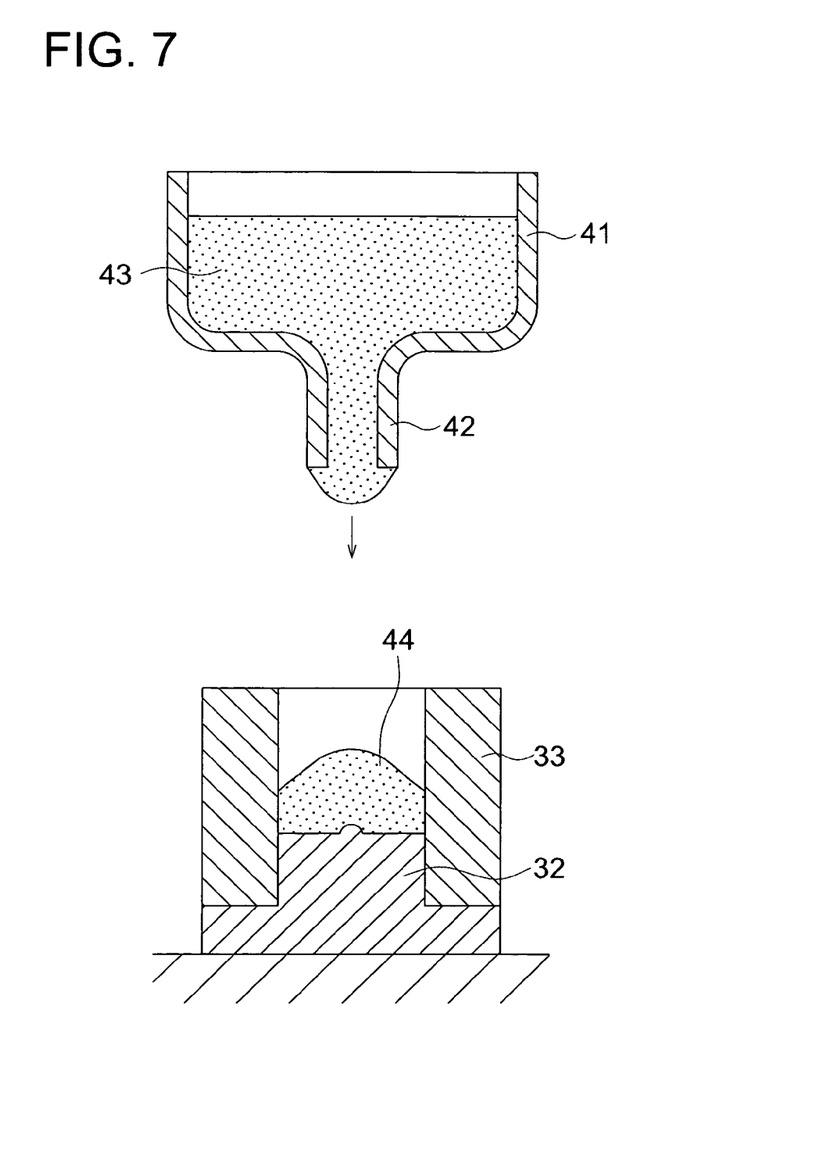
FIG. 7 is a schematic diagram showing a state of the metal molding die in a supplying step.

The supplying process is a process for supplying the predetermined volume of molten glass drop having a temperature higher than that of the metal molding die onto the lower molding die. FIG. 7 shows a schematic drawing of the state of the metal molding die in the supplying process.

A melting tank 41 is heated by a heater, not shown in the drawing, in which molten glass 43 is stored. A dropping nozzle 42 is provided at the bottom of the melting tank 41 and the molten glass supplied from the melting tank 41 is accumulated at the end of the dropping nozzle 42. When the volume of the glass at the end of the dropping nozzle 42 amounts to the predetermined value, the molten glass is naturally released from the end of the dropping nozzle 42 by the weight thereof and a molten glass drop 44 having the predetermined volume is dropped down onto the lower molding die 32.

The volume of the molten glass drop 44 is controlled to be within the range of from 0.8 to 0.97 times of the whole fillable space. The optical element having the side molded-surface 13 for position deciding and the high precision molded-surfaces (the upper molded-surface 11 and the lower molded-surface 12) can be manufactured with high production efficiency by such the processing.

The volume of the molten glass drop 44 can be adjusted by varying the external diameter of the end portion of the dropping nozzle 42. The molten glass drop having a volume of approximately from 30 mm$^3$ to 500 mm$^3$ can be usually dropped by controlling the external diameter of the end portion of the dropping nozzle 42 though the volume is influenced by the kind of the glass. The volume of the molten glass drop 42 is also influenced by the heating temperature of the dropping nozzle 42 and flowing amount of the molten glass. Thus, the molten glass drop 44 having the predetermined volume can be dropped on and supplied to the lower molding die 32 by suitably setting these conditions.

Moreover, it is possible that the molten glass drop 44 is struck to a member having a fine through hole and a part of the struck molten glass drop is extruded to the backside of the fine through hole to be supplied to the lower molding die 32, instead of being supplied from the dropping nozzle 42 onto the lower molding die 32 (see Japanese Laid-open Patent Publication No. 2002-154834).

Figure 8:
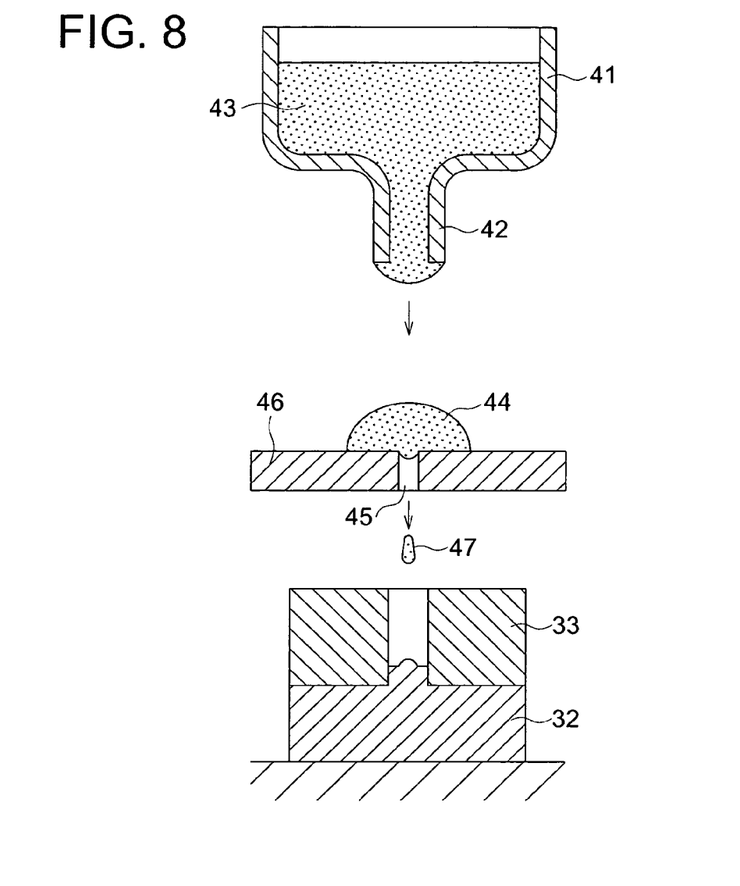
FIG. 8 is a schematic diagram showing a method for supplying a molten glass drop through a fine through hole.

FIG. 8 shows a schematic drawing showing a molten glass drop supplying method using the fine through hole. The member 46 having a fine through hole 45 is disposed between the dropping nozzle 42 and the lower molding die 32. The molten glass drop 44 released from the end portion of the dropping nozzle 42 hits the member 46 having the fine through hole 46 and a part of the molten glass drop 44 is extruded to the backside of the fine through hole 45 as a small molten glass drop 47 to be supplying onto the lower molding die 32.

The molten glass drop 47 having a small volume such as 1 $mm^3$ to 100 $mm^3$ can be supplied to the lower molding die 32. Moreover, the volume of the molten glass drop 47 can be controlled by varying the diameter of the fine through hole 45 without exchanging the dropping nozzle 42. Therefore, such method is preferable since various kinds of optical elements can be manufactured with high efficiency.

The kind of usable glass is not specifically limited, and glass known as the material for optical elements can be selected depending on the use thereof. Phosphate type glass and lanthanum type glass are usable, for example.

(Pressing Step)

Figure 9:
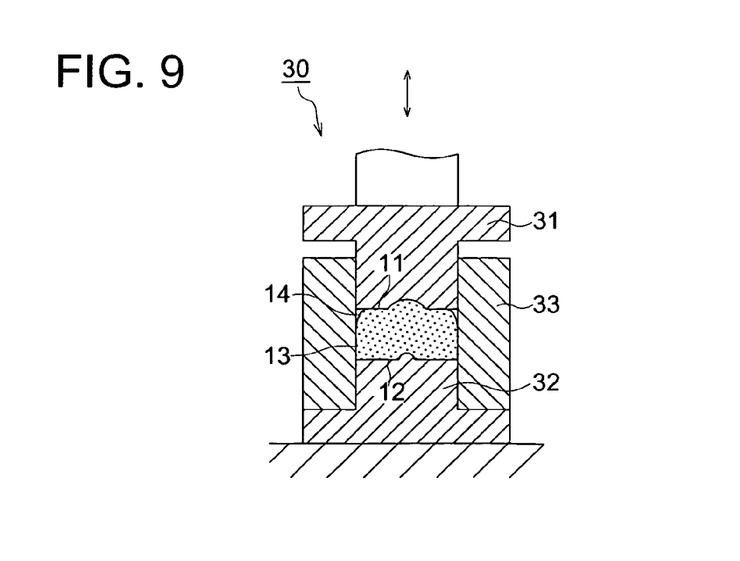
FIG. 9 is a schematic diagram of a state of a metal molding die 30 in the pressing step.

The pressing step is a step for pressure-molding, with the metal molding die, the molten glass drop supplied to the lower molding die. FIG. 9 shows a schematic drawing of the state of the metal molding die 30 in the pressing step.

As is shown in FIG. 9, the constitution is preferable, in which the upper molding die 31 and the lower molding die 32 are not touched with each other even when the pressure-molding is finished. With such constitution, the pressure can be continuously applied until the molten glass drop is cooled and sufficiently solidified, and the upper molded-surface 11 and lower molded-surface with higher precision can be formed. The relative position of the upper molding die 31 with respect to the lower molding die 32 gets smaller with time during the pressure-molding, and the motion is stopped when the molten glass drop is solidified and not deformed. Accordingly, the thickness of the optical element is decided by the supplied volume of molten glass drop and the waiting time until the start of pressing.

The molten glass drop is at a melted state at a temperature higher than that of the metal molding die at the time of being supplied to the lower molding die 32, but the drop is cooled losing heat through the surface in contact with the lower molding die 32 and the side molding die 33 after supplied to the lower molding die 32, and the viscosity of the molten glass drop is gradually raised. If pressured is applied by lowering the upper molding die 32 just after the supplying, the space in the metal molding die is entirely filled and any free surface 14 is not formed on the obtained optical element since the viscosity of the molten glass is low enough for the shape thereof to be deformed. Consequently, a large difference in temperature is created between the circumference, of the molten glass, in contact with the metal molding die during the pressing and the central portion of the molten glass, so that the high precision molded-surface cannot be formed.

In contrast, if the molten glass drop is left for a predetermined time after the supplying and then pressed, the molten glass drop is pressed after the molten glass is cooled and the viscosity thereof is raised by some degree. Accordingly, the glass is not fully supplied near the border between the upper molding die 31 and the side molding die 32, and the free surface 14 is formed between the upper molded-surface 11 and the side molded-surface 13 of the obtained optical element. A large temperature difference is not caused between the circumference portion and the central portion of the molten glass during the pressing, and the molded-surface with high precision can be formed since the free surface 14 is formed without contacting with the metal molding die.

The free surface gets larger with the waiting time between the supplying of the molten glass drop and the start of the pressure application. However, the thickness of the optical element is increased with the waiting time under the condition that the volume of the supplied molten glass is constant. Therefore, the volume of the molten glass drop to be supplied should be adjusted depending on the waiting time in order to obtain optical elements having a constant thickness. In order to control the thickness, the volume of the molten glass drop is decreased as the waiting time is increased, and the volume is increased as the waiting time is decreased.

As a result of investigation by the inventors, it is found that the molded-surface with high precision can be obtained by setting the volume of the molten glass drop within from 0.8 to 0.97 times of the volume of the whole fillable space 100 shown in FIG. 3. The ratio is particularly preferable from 0.85 to 0.95 times. When the volume of the molten glass drop is greater than 0.97 times, the cooling through the side surface of the molten glass drop in contact with the metal molding die is rapidly progressed and large temperature difference is caused between the circumference portion and the central portion of the molten glass drop, so that the molded-surface with high precision is difficult to be obtained. When the ratio is lower than 0.8, a prolonged waiting time before the pressure application is required for obtaining the necessary thickness, so that the temperature of the molten glass drop is excessively lowered and the precision of the molded-surface is degraded.

It is preferable that the practical waiting time is experimentally decided since the waiting time depends on the temperature of the metal molding die 30 and the molten glass drop, the kind of glass, and the size and shape of the optical element. In general, the necessary free surface 14 can be formed with a waiting time of from several seconds to several ten seconds.

There is no limitation on the pressure applying means, and a known pressing means such as an air cylinder, an oil pressure cylinder or an electric cylinder using a servomotor is optionally selected to be used.

The cooling of the optical element 10 progresses by heat transfer through the surface in contact with the metal molding die 30 also while the pressure is applied by the metal molding die 30. The pressure is released when the optical element is cooled to a temperature at which the molded-surface is not deformed even when the pressure is released, and the upper molding die 31 is pulled out from the side molding die 33 to release the optical element 10. The temperature suitable for releasing the pressure is usually a temperature near the Tg of the glass even though the temperature depends on the kind of the glass, the size and shape of the optical element 10 and the required precision. The releasing of the optical element 10 can be carried out by using a known releasing device utilizing a sucking system.

EXAMPLES

Examples 1 to 5

The optical element 10 shown in FIG. 1 was prepared by using the metal molding die 30 shown in FIG. 6. The material of the upper molding die 31, lower molding die 32 and side molding die 33 was also an ultra hard material mainly composed of tungsten carbide. The temperatures of the upper molding die 31, lower molding die 32 and side molding die 33 of the metal molding die 30 were 450° C., 470° C. and 470° C., respectively.

The optical surface 11c of the optical element 10 was a cylindrical surface having an arc with a radius of 3 mm on the cross section perpendicular to the generatrix, and the optical surface 12c was a cylindrical surface having an arc with a radius of 2 mm on the cross section perpendicular to the generatrix. The thickness of the central portion was 4 mm. The circumference of the extended upper molded-surface 110 was 4 mm×4 mm, and the height of the extended side molded-surface 132 was 4.1 mm, as shown in FIG. 3. The volume of the whole fillable space 100 was 66 mm³.

The molten glass drop was supplied by the method in which the molten glass drop 44 was dropped from the dropping nozzle 42 and directly supplied to the lower molding die 32. As the glass material, phosphate type glass having a Tg of 480° C. was used. The heating temperature of the dropping nozzle was 1,000° C.

The volume of the molten glass drop was varied, by varying the external diameter of the end of the dropping nozzle 42, in five values of 0.97 (Example 1), 0.95 (Example 2), 0.9 (Example 3), 0.85 (Example 4) and 0.8 (Example 5) to prepare the optical elements 10. The waiting time was controlled depending on the volume of the molten glass drop, so that the thicknesses of the optical elements were kept constant (4 mm). In the pressing step, the load and time of the pressing were 200 N and 10 seconds, respectively.

The precision of the optical surface 11c of the thus obtained optical elements was evaluated. For the evaluation, the shape of the optical surface 11c was measured in the direction perpendicular to the generatrix with a touching type shape determining apparatus, PG1840 manufactured by Taylor Hobson Ltd., and the largest value of deviation from the sphere face (arc) was determined. The result was evaluated as excellent (A) when the deviation was less than 0.1 µm, good (B) when the deviation was not less than 0.1 µm to less than 0.15 µm, and problematic (C) when the deviation was not less than 0.15 µm.

The results of the evaluation are listed in Table 1. The largest value of deviation was less than 0.15 µm under any conditions of Examples 1 to 5 and the optical surface with high precision was obtained. Among them, the largest value of deviation was less than 0.1 µm and the results were excellent in the case of the volume of the molten glass drop was within the range of from 0.85 to 0.95 times of the whole fillable space (Examples 2 to 4).

TABLE 1

| | Volume of molten glass drop (mm³) | (Volume of molten glass drop)/ (Volume of whole fillable space) | Shape precision of optical surface (µm) | Evaluation |
|---|---|---|---|---|
| Example 1 | 64.0 | 0.97 | 0.14 | B |
| Example 2 | 62.7 | 0.95 | 0.1 | A |
| Example 3 | 59.4 | 0.9 | 0.06 | A |
| Example 4 | 56.1 | 0.85 | 0.08 | A |
| Example 5 | 52.8 | 0.8 | 0.12 | B |
| Comparative Example 1 | 65.3 | 0.99 | 0.2 | C |
| Comparative Example 2 | 49.5 | 0.75 | 0.17 | C |

Comparative Examples 1 and 2

Comparative examples were prepared and evaluated in the same manner as in Examples 1 to 5 except that the volume of molten glass drop is 0.99 times (Comparative Example 1) or 0.75 times (Comparative example 2) of the whole fillable space 100. The results of the evaluation are also listed in Table 1.

In both of Comparative Examples 1 and 2, the largest deviation was not less than 0.15 µm, and it was confirmed that the shape precision is lower than Examples 1 to 5.

The invention claimed is:

1. A method for manufacturing an optical element having an upper molded-surface, a lower molded-surface, and a side molded-surface by pressure-molding a molten glass drop using a molding die having an upper molding die for molding the upper molded-surface, a lower molding die for molding the lower molded-surface, and a side molding die for molding the side molded-surface, the method comprising, in order:

supplying the lower molding die with the molten glass drop of a predetermined volume and a temperature higher than a temperature of the upper molding die;

leaving the molten glass drop on the lower molding die for a predetermined waiting time as to lower the temperature of the molten glass drop; and pressure-molding the molten glass by lowering the upper molding die to a molding position so as to form the upper molded-surface by contact of the glass with the upper molding die, the lower molded-surface by contact of the glass with the lower molding die, the side molded-surface by contact of the glass with the side-molding die, and to form a free surface of the glass, between the upper molded-surface and the side molded-surface, wherein the free surface of the glass is solidified while the upper molding die is at the molding position and while said free surface is apart from the upper and side molding dies, and wherein the predetermined volume of the molten glass drop is set to be 0.8 times or more and 0.97 times or less a volume of a space defined, when the upper molding die is at the molding position, by 1) an extended theoretical upper molded-surface generated by extrapolating the upper molded-surface, formed when the upper molding die is at the molding position, to an extended theoretical side molded surface defined by and coincident with the side molded-surface, 2) the extended theoretical side molded surface is generated by extrapolating the side molded-surface to the extended theoretical upper molded-surface that is defined by and coincident with the upper molded-surface formed when the upper molding die is at the molding position, and 3) the lower molded-surface, and wherein the predetermined volume is also set so that the free surface has the predetermined size.

2. The method of claim 1 for manufacturing an optical element, wherein the optical element includes an optical surface in each of the upper molded-surface and the lower molded-surface.

3. The method of claim 1 for manufacturing an optical element, wherein the side molded-surface includes two plane surfaces which are approximately perpendicular to each other.

4. The method of claim 3 for manufacturing an optical element, wherein the two plane surfaces are in contact with each other; the free surface is surrounded by the upper molded-surface and the two plane surfaces; and the upper molded-surface and each of two plane surfaces are in contact with each other.

5. The method of claim 3 for manufacturing an optical element, wherein the two plane surfaces are in contact with each other; the free surface is formed between the upper molded-surface and the side molded-surface such that the free surface surrounds the upper molded-surface.

6. The method of claim 1 for manufacturing an optical element, wherein at least one of the upper molded-surface and the lower molded-surface has an optical surface including a cylindrical surface or a toroidal surface.

7. The method of claim 1 for manufacturing an optical element, wherein the predetermined volume ranges from 0.85 to 0.95 times the theoretical volume of a space.

* * * * *